US012804305B2

(12) United States Patent
Chen et al.

(10) Patent No.: US 12,804,305 B2
(45) Date of Patent: Nov. 17, 2026

(54) OVER-EAR HEADPHONE

(71) Applicant: BENQ CORPORATION, Taipei City (TW)

(72) Inventors: Chang-Jung Chen, Taipei City (TW); Yen-Chen Lai, New Taipei City (TW)

(73) Assignee: BENQ CORPORATION, Taipei City (TW)

( * ) Notice: Subject to any disclaimer, the term of this patent is extended or adjusted under 35 U.S.C. 154(b) by 144 days.

(21) Appl. No.: 19/055,509

(22) Filed: Feb. 18, 2025

(65) Prior Publication Data

US 2026/0039993 A1 Feb. 5, 2026

(30) Foreign Application Priority Data

Aug. 1, 2024 (TW) ................................ 113128730

(51) Int. Cl.
*H04R 1/10* (2026.01)

(52) U.S. Cl.
CPC ......... *H04R 1/1066* (2013.01); *H04R 1/1008* (2013.01); *H04R 1/1041* (2013.01); *H04R 1/105* (2013.01)

(58) Field of Classification Search
CPC .... H04R 1/105; H04R 1/1041; H04R 1/1008; H04R 1/1066; H04R 5/0335
See application file for complete search history.

(56) References Cited

U.S. PATENT DOCUMENTS 5,862,241 A * 1/1999 Nelson ................. H04R 1/1066 381/374
9,973,854 B1 * 5/2018 Zimmer ................... A42B 3/30
2017/0026736 A1 * 1/2017 Yang .................... H04R 1/1066
2019/0320753 A1 * 10/2019 Le ........................ A42B 3/0406
2021/0392424 A1 * 12/2021 Hoang ................. H04R 1/1066

* cited by examiner

*Primary Examiner* — Jason R Kurr
(74) *Attorney, Agent, or Firm* — Winston Hsu

(57) ABSTRACT

An over-ear headphone includes a headband, two earmuffs, and two clamping-force adjusting mechanism connecting the earmuffs to the headband. Each clamping-force adjusting mechanism includes a pivot base, an adjusting component, a pin, and a button. The pivot base is connected to the headband and has a hole structure at a first side. The adjusting component is pivoted to the pivot base and connected to the earmuff. The pin is telescopically disposed through the adjusting component. The button is pressably disposed at the first side. When the button is pressed, a protrusion of the button enters the hole structure to push the pin out of the hole structure, for allowing the adjusting component to rotate to adjust a clamping force of the earmuff upon a user's head. When the button is released, the pin returns to be engaged with the hole structure for fixing a pivot angle of the adjusting component.

14 Claims, 9 Drawing Sheets

OVER-EAR HEADPHONE

BACKGROUND OF THE INVENTION

1. Field of the Invention

The present invention relates to an over-ear headphone, and more specifically, to an over-ear headphone utilizing buttons to release pins for adjusting a clamping force of earmuffs.

2. Description of the Prior Art

In general, an over-ear headphone available on the market today are widely used in daily life due to convenience in wearing and ease of portability, as a width and a clamping force of earmuffs on both sides of the over-ear headphone can be adjusted according to a user's head shape.

In practical applications, due to significant differences in head shapes of users of different ages, genders, and ethnicities, for a user with a narrower head shape, a clamping force provided by the over-ear headphone is often insufficient or too loose, thereby causing sound leakage that affects sound quality provided by the over-ear headphone. On the contrary, the clamping force provided by the over-ear headphone could also make a user with a wider head shapes feel too tight. In addition, it would cause obvious discomfort after long-term wearing. Therefore, the over-ear headphone is often equipped with a clamping-force adjusting mechanism that allows a user to fine-tune the clamping forces of the over-ear headphone for meeting the user's actual wearing needs.

However, in the prior art, a conventional clamping-force adjusting mechanism usually adopts a clamping-force adjusting design of replacing adjustment pads or tightening screws, which often leads to the problem of losing the adjustment pads during operation or a time-consuming and strenuous process of tightening the screws.

SUMMARY OF THE INVENTION

The present invention provides an over-ear headphone wearable on a user's head. The over-ear headphone includes a headband, two earmuffs, and two clamping-force adjusting mechanisms connecting the two earmuffs to two ends of the headband respectively. Each clamping-force adjusting mechanism includes a pivot base, an adjusting component, a first pin, and a first button. The pivot base is connected to the end of the headband. A first side of the pivot base has a first hole structure. The adjusting component is pivoted to the pivot base and connected to the earmuff. The first pin is telescopically disposed through the adjusting component to be operably engaged with or disengaged from the first hole structure. The first button is pressably disposed at the first side of the pivot base. A first protrusion protrudes from the first button toward the first hole structure. When the first button is pressed, the first protrusion enters the first hole structure to push the first pin out of the first hole structure, for making the adjusting component rotatable to adjust a clamping force of the earmuff upon the user's head. When the first button is released, the first pin returns to be engaged with the first hole structure for fixing a pivot angle of the adjusting component relative to the pivot base.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
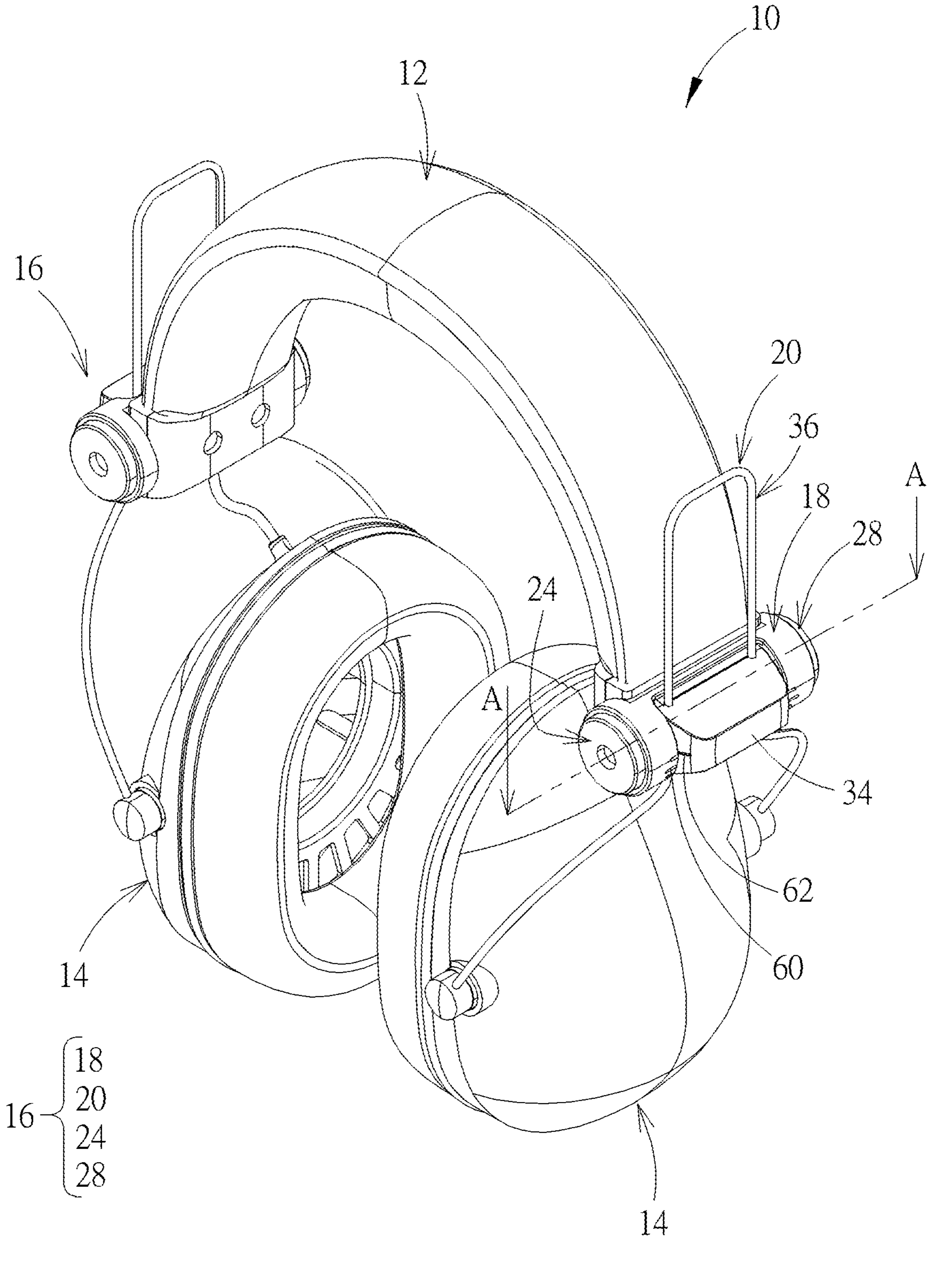
FIG. 1 is a diagram of an over-ear headphone according to an embodiment of the present invention.

The present invention will now be described more specifically with reference to the following embodiments and the accompanying drawings. Other advantages and effects of the present invention can be easily understood by a person ordinarily skilled in the art in view of the detailed descriptions and the accompanying drawings. The present invention can be implemented or applied to other different embodiments. Certain aspects of the present invention are not limited by the particular details of the examples illustrated herein. Without departing from the spirit and scope of the present invention, the present invention will have other modifications and changes. It should be understood that the appended drawings are not necessarily drawn to the scale and configuration of each component (e.g., sizes of a headband and earmuffs) in the drawings is merely illustrative, not presenting an actual condition of the embodiments.

Figure 2:
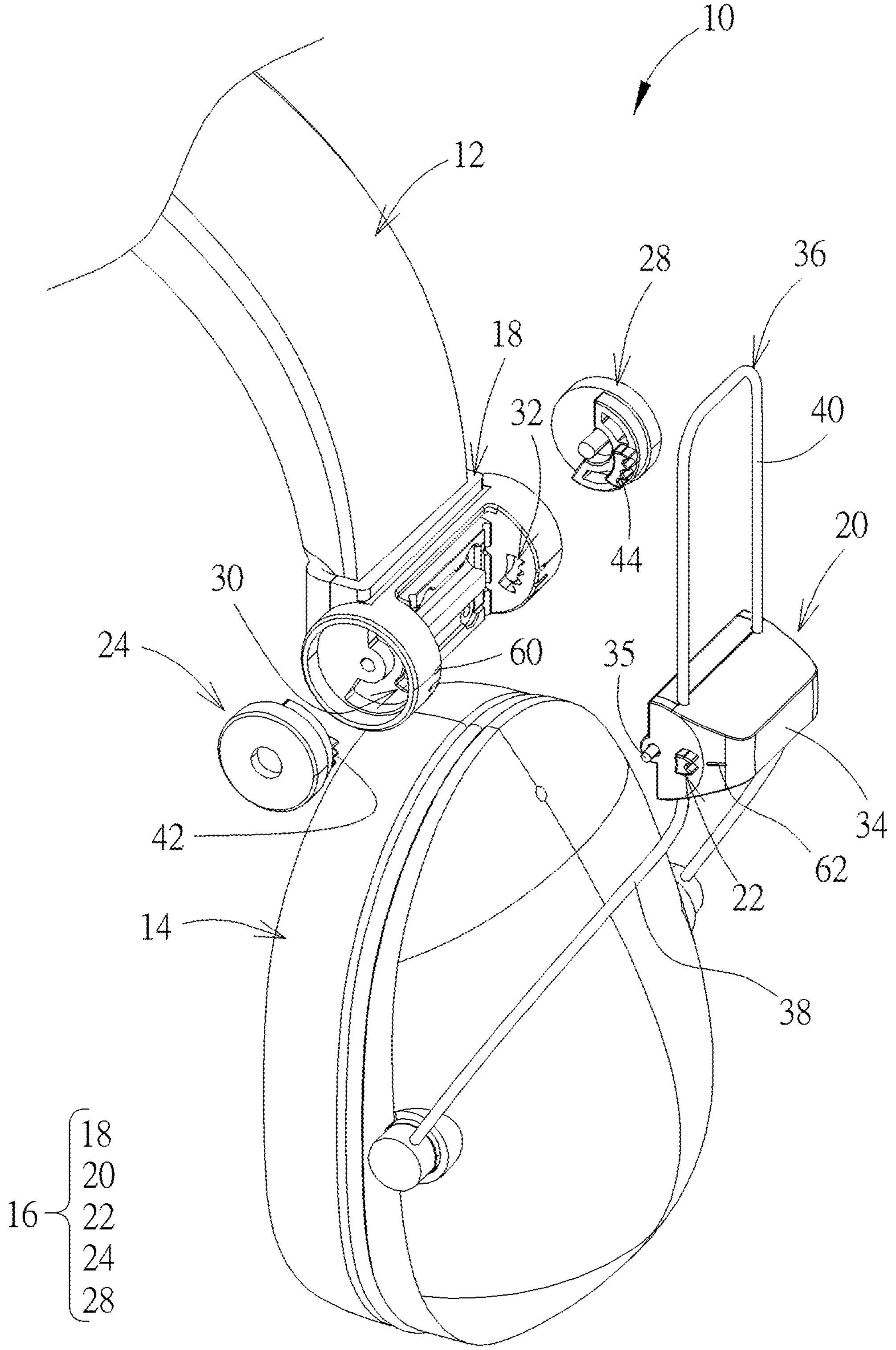
FIG. 2 is a partially exploded diagram of the over-ear headphone in FIG. 1.

Please refer to FIG. 1 and FIG. 2. FIG. 1 is a diagram of an over-ear headphone 10 according to an embodiment of the present invention. FIG. 2 is a partially exploded diagram of the over-ear headphone 10 in FIG. 1. The over-ear headphone 10 is designed to be worn on a user's head in a wireless or wired connection to allow the user to listen to sound signals (e.g., music or broadcasts) played by an electronic device (e.g., a TV, a laptop or a mobile phone). As shown in FIG. 1 and FIG. 2, the over-ear headphone 10 includes a headband 12, two earmuffs 14, and two clamping-force adjusting mechanisms 16. The headband 12 could adopt an arched headband design (the related description is commonly seen in the prior art and omitted herein), allowing the over-ear headphone 10 to conform to a contour of a user's head and be securely worn. The two clamping-force adjusting mechanisms 16 connect the two earmuffs 14 respectively to two ends of the headband 12, so that the two earmuffs 14 can cover the user's ears for providing the user with an undisturbed audio-visual listening experience.

More detailed description for the clamping-force adjusting mechanism 16 located at a side of the headband 12 is provided as follows. As for the related description for the clamping-force adjusting mechanism 16 located at the other side of the headband 12, it could be reasoned by analogy and omitted herein. As shown in FIGS. 1 and 2, the clamping-force adjusting mechanism 16 includes a pivot base 18, an adjusting component 20, a first pin 22, a first button 24, a second pin 26, and a second button 28. The pivot base 18 is connected to an end portion of the headband 12, and both sides of the pivot base 18 respectively have a first hole structure 30 and a second hole structure 32. The adjusting component 20 is connected to the earmuff 14 and is pivoted to the pivot base 18 to allow the earmuff 14 to pivot relative to the pivot base 18, thereby enabling the user to appropriately adjust a clamping force exerted by the earmuff 14 on the user's head according to actual wearing needs. To be more specific, in this embodiment, the adjusting component 20 could include an operating block 34 and an adjusting rod 36. The operating block 34 is pivoted to the pivot base 18 (e.g., via a shaft 35 as shown in FIG. 2), and the adjusting rod 36 could have a bent section 38 and a length-adjusting section 40. The bent section 38 extends inwardly from the length-adjusting section 40 relative to the headband 12 and is connected to the earmuff 14. The length-adjusting section 40 is slidably disposed through the operating block 34, allowing the user to adjust a distance between the earmuff 14 and the operating block 34 by pulling up or pushing down the length-adjusting section 40, so that the user can accurately move the earmuff 14 to cover his ear.

Figure 3:
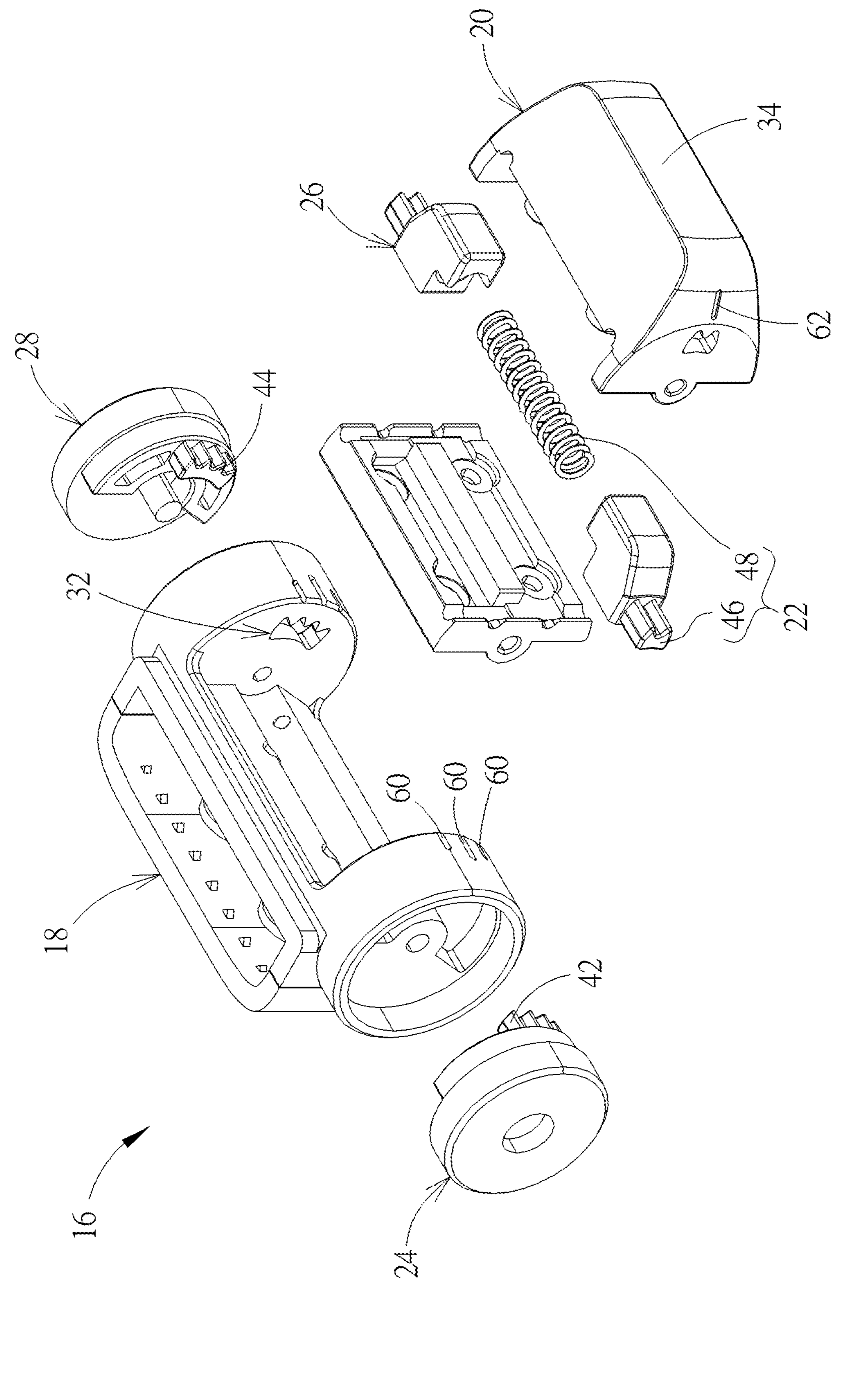
FIG. 3 is a partially exploded diagram of a pivot base, an adjusting component, a first pin, a first button, a second pin, and a second button in FIG. 2.
Figure 4:
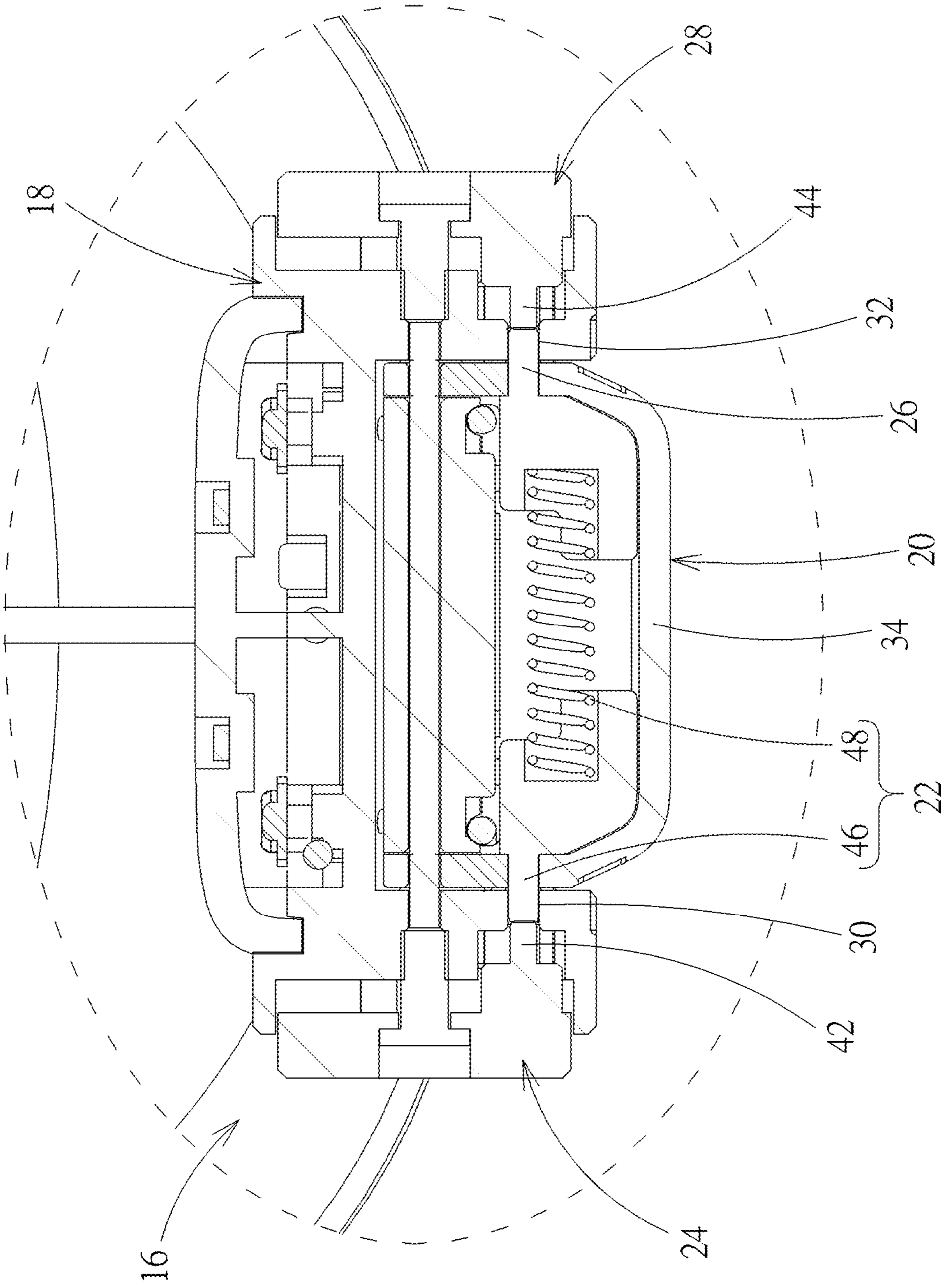
FIG. 4 is a partial cross-sectional diagram of the over-ear headphone along a cross-sectional line A-A in FIG. 1.
Figure 5:
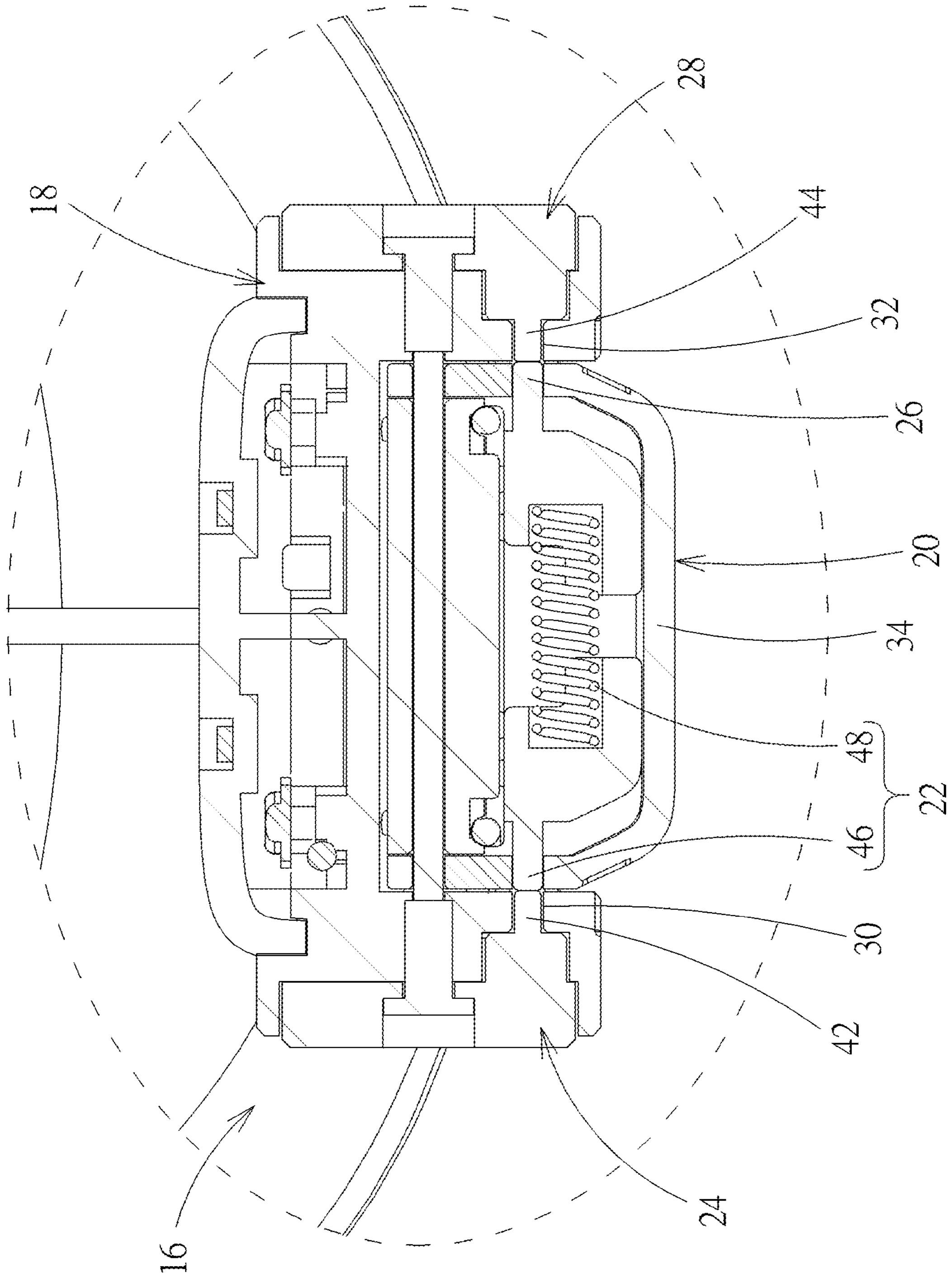
FIG. 5 is a partial cross-sectional diagram of the over-ear headphone when the first button and the second button are pressed.
Figure 6:
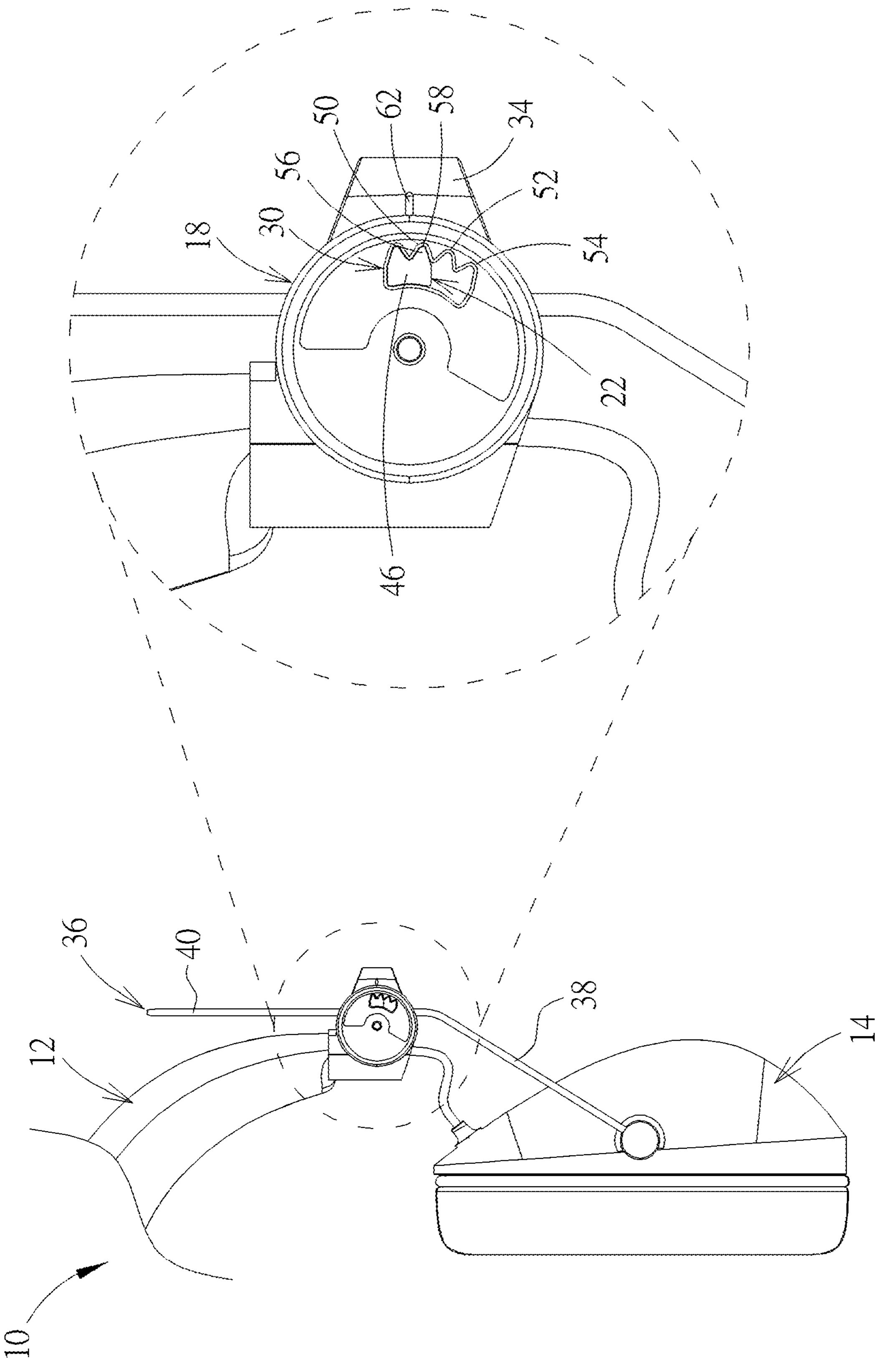
FIG. 6 is a partially enlarged front view of the over-ear headphone in FIG. 1.
Figure 7:
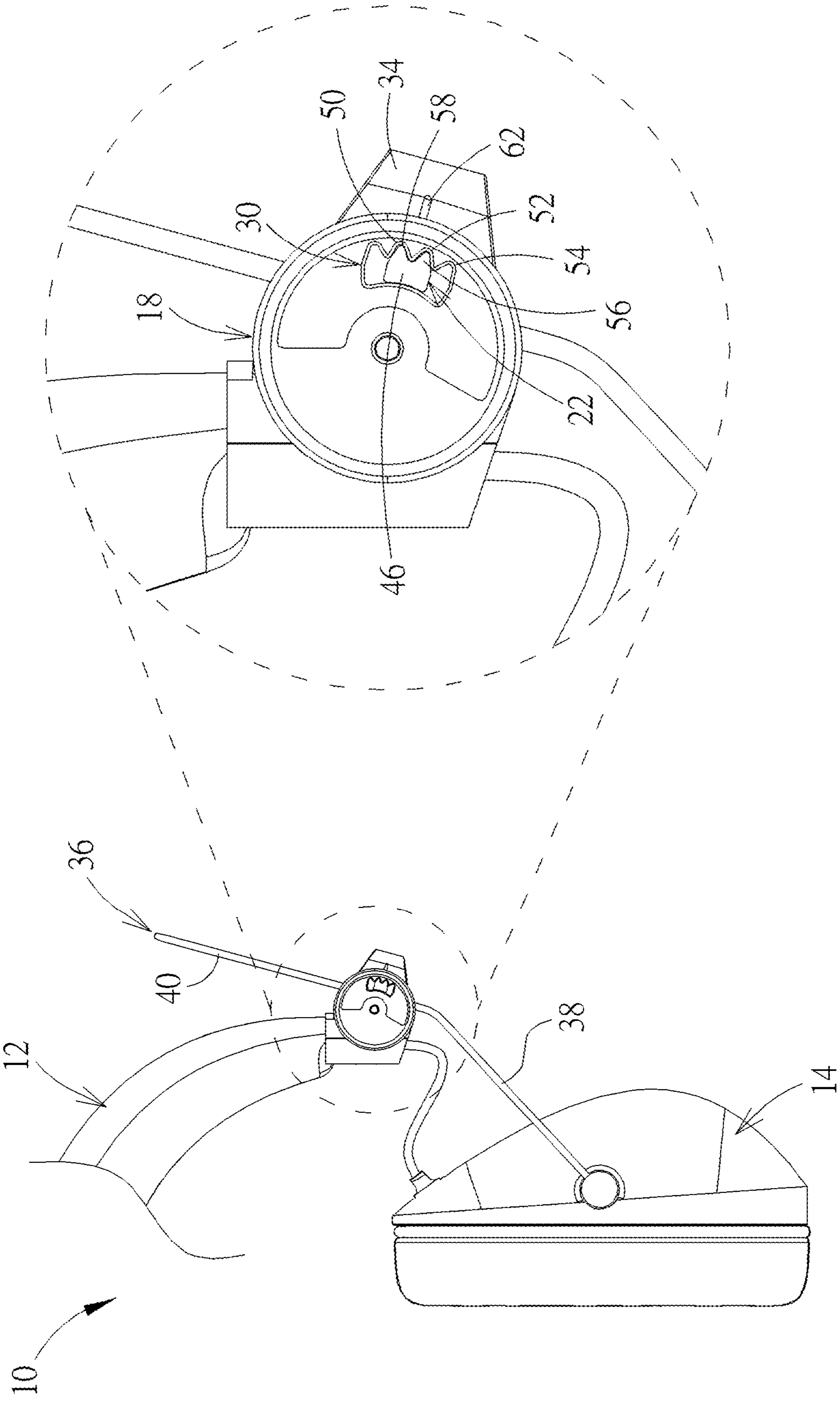
FIG. 7 is a partially enlarged front view showing rotation of an operating block to adjust a clamping force exerted by an earmuff on a user's head.

Please refer to FIGS. 2-7. FIG. 3 is a partially exploded diagram of the pivot base 18, the adjusting component 20, the first pin 22, the first button 24, the second pin 26, and the second button 28 in FIG. 2. FIG. 4 is a partial cross-sectional diagram of the over-ear headphone 10 along a cross-sectional line A-A in FIG. 1. FIG. 5 is a partial cross-sectional diagram of the over-ear headphone 10 when the first button 24 and the second button 28 are pressed. FIG. 6 is a partially enlarged front view of the over-ear headphone 10 in FIG. 1. FIG. 7 is a partially enlarged front view showing rotation of the operating block 34 to adjust the clamping force exerted by the earmuff 14 on the user's head. For clearly showing the engagement structure relationship between the first pin 22 and the first hole structure 30, the first button 24 is omitted in FIGS. 6 and 7.

As shown in FIGS. 2-7, the first button 24 and the second button 28 are pressably disposed on both sides of the pivot base 18 and protrude toward the first hole structure 30 and the second hole structure 32 to form a first protrusion 42 and a second protrusion 44, respectively. The first pin 22 and the second pin 26 are telescopically disposed through the operating block 34, allowing the first pin 22 to be operably engaged with or disengaged from the first hole structure 30 and allowing the second pin 26 to be operably engaged with or disengaged from the second hole structure 32. In other words, the over-ear headphone 10 can achieve the purpose of unlocking the operating block 34 by pushing the first pin 22 and the second pin 26 via the first protrusion 42 and the second protrusion 44, respectively. The first pin 22 and the second pin 26 could preferably adopt an elastic returning design. For example, as shown in FIG. 3, the first pin 22 could include a pin 46 and an elastic component 48 (the related description of the elastic returning design of the second pin 26 could be reasoned by analogy and omitted herein). The pin 46 is telescopically disposed through the operating block 34, and the elastic component 48 (preferably a spring, but not limited thereto) is disposed inside the operating block 34 and connected to the pin 46. As such, the elastic component 48 can provide an elastic force to drive the pin 46 into the first hole structure 30, so as to generate an automatic returning effect.

In addition, in this embodiment, the first hole structure 30 and the second hole structure 32 could have the same structural design and each could include at least two holes. As shown in FIG. 6, there are three holes 50, 52, 54 arranged circumferentially relative to a central pivot shaft of the pivot base 18 (but not limited thereto, meaning that the number of holes depends on the actual clamping-force adjustment needs of the over-ear headphone 10). The first pin 22 could preferably adopt a concave-convex engagement design, which could also be applied to the second pin 26 (the related description could be reasoned by analogy and omitted herein). For example, as shown in FIGS. 6 and 7, the first pin 22 could have at least one bump 56, and the hole 50 has at least one groove 58 corresponding to the bump 56. For making engagement between the pin 46 and the hole 50 more secure, as shown in FIG. 6, there are two bumps 56 formed on the pin 46 to be respectively engaged with two grooves 58 in the hole 50 (but not limited thereto, meaning that the present invention could also adopt a design in which the pin 46 has one single bump 56 to be engaged with one single groove 58 in the hole 50). The grooves in the holes 50, 52, 54 could be preferably tooth-shaped, so that the first hole structure 30 can form an arc-shaped serrated hole for the segmented engagement of the bump 56. Via the aforesaid design, the bump 56 can cooperate with the groove 58 to make the first pin 22 engaged with the first hole structure 30, so as to fix a pivot angle of the operating block 34 relative to the pivot base 18. To be noted, the hole design of the present invention is not limited to the aforesaid embodiment in which the holes are communicated with each other to form a continuous arc-shaped hole structure, meaning that the present invention could also adopt a hole design in which the holes are arranged at intervals. For example, in another embodiment, at least two holes formed in the hole structure of the pivot base could be are spaced apart from each other circumferentially relative to the central pivot shaft of the pivot base, and the related description could be reasoned by analogy according to the aforesaid embodiments and omitted herein.

In practical applications, structural contours of the first protrusion 42 and the second protrusion 44 could be at least partially matched with the first hole structure 30 and the second hole structure 32 (fully matched with each other as shown in FIGS. 2 and 3, but not limited thereto), so as to allow the first protrusion 42 and the second protrusion 44 to reliably push the first pin 22 and the second pin 26 out of the first hole structure 30 and the second hole structure 32, respectively, thereby achieving the purpose of unlocking the operating block 34. In addition, the over-ear headphone 10 could preferably adopt a scale indicator design. For example, as shown in FIGS. 1-3, the pivot base 18 has at least two clamping-force adjustment scales 60 formed circumferentially corresponding to the first hole structure 30 (three shown in FIG. 3, but not limited thereto), and the operating block 34 has an indicator mark 62 corresponding to the clamping-force adjustment scales 60. Via the aforesaid design, the user can conveniently rotate the operating block 34 to a position where the indicator mark 62 is aligned with one of the clamping-force adjustment scales 60, for completing the clamping-force adjustment operation of the over-ear headphone 10.

Rotating the operating block 34 from a position where the bump 56 is engaged with the hole 50 to a position where the bump 56 is engaged with the hole 52 is taken as an example herein to illustrate the clamping-force adjustment operation of the over-ear headphone 10. As for the clamping-force adjustment operation of pivoting the operating block 34 to other engaging positions, the related description could be reasoned by analogy and omitted herein. First, when the user wants to perform the clamping-force adjustment operation of the over-ear headphone 10, the user just needs to press the first button 24 and the second button 28 for making the first protrusion 42 of the first button 24 and the second protrusion 44 of the second button 28 enter the first hole structure 30 and the second hole structure 32, respectively (as shown in FIG. 5). During this process, the first pin 22 and the second pin 26 are pushed inwardly by the first protrusion 42 and the second protrusion 44, respectively, such that the first pin 22 and the second pin 26 can move inwardly from the engaging positions in the first hole structure 30 and the second hole structure 32 (as shown in FIG. 4) to the disengaged positions outside the first hole structure 30 and the second hole structure 32 (as shown in FIG. 5). Accordingly, engagement of the first pin 22 and the second pin 26 with the first hole structure 30 and the second hole structure 32 can be released, so as to make the operating block 34 rotatable relative to the pivot base 18 for the user to perform subsequent pivoting operations.

After the aforesaid releasing operation is completed, the user can rotate the operating block 34 relative to the pivot base 18 to increase or decrease a clamping force exerted by the earmuff 14 on the user's head. For example, the user can rotate the operating block 34 downward relative to the pivot base 18 from a position as shown in FIG. 6 until the operating block 34 is rotated to a position as shown in FIG. 7 (i.e., the position where the indicator mark 62 is aligned with the clamping-force adjustment scale 60 in a middle position as shown in FIG. 1). During this process, as the operating block 34 is rotated downward, the first pin 22 can rotate from a position aligned with the hole 50 to a position aligned with the hole 52. Subsequently, the user can stop pressing the first button 24 and the second button 28. At this time, since the first pin 22 and the second pin 26 are no longer pushed by the first protrusion 42 and the second protrusion 44, an elastic force provided by the elastic component 44 can return the first pin 22 and the second pin 26 to be engage with the first hole structure 30 and the second hole structure 32, respectively, so as to fix a pivot angle of the operating block 34 relative to the pivot base 18 (as shown in FIG. 7). Accordingly, the clamping-force adjustment operation of the over-ear headphone 10 is completed.

In summary, via the aforesaid design in which the pin on the adjusting component can be operably engaged with or disengaged from the pivot base by pressing or releasing the button, the present invention allows the user to rotate the adjusting component to adjust the clamping force exerted by the earmuff on the user's head when the button is pressed, or to fix the pivot angle of the adjusting component when the button is released. In such a manner, the user can quickly and easily complete the clamping-force adjustment operation of the over-ear headphone via the aforesaid simple button pressing operation, and the present invention can effectively solve the prior art problem in which the adjustment pads could be lost easily during operation or tightening the screws is time-consuming and strenuous. Thus, the operational convenience and reliability of the over-ear headphone can be greatly improved.

It should be mentioned that the button configuration and the adjusting component design adopted in the present invention are not limited to the above embodiments. For example, in another embodiment, the present invention could adopt a single-sided button configuration or an adjusting component design that omits the adjusting rod for directly connecting the operating block to the earmuff, so as simplify the mechanical design of the clamping-force adjusting mechanism of the over-ear headphone. The related description for the above simplified designs could be reasoned by analogy according to the aforesaid embodiments and omitted herein.

Figure 8:
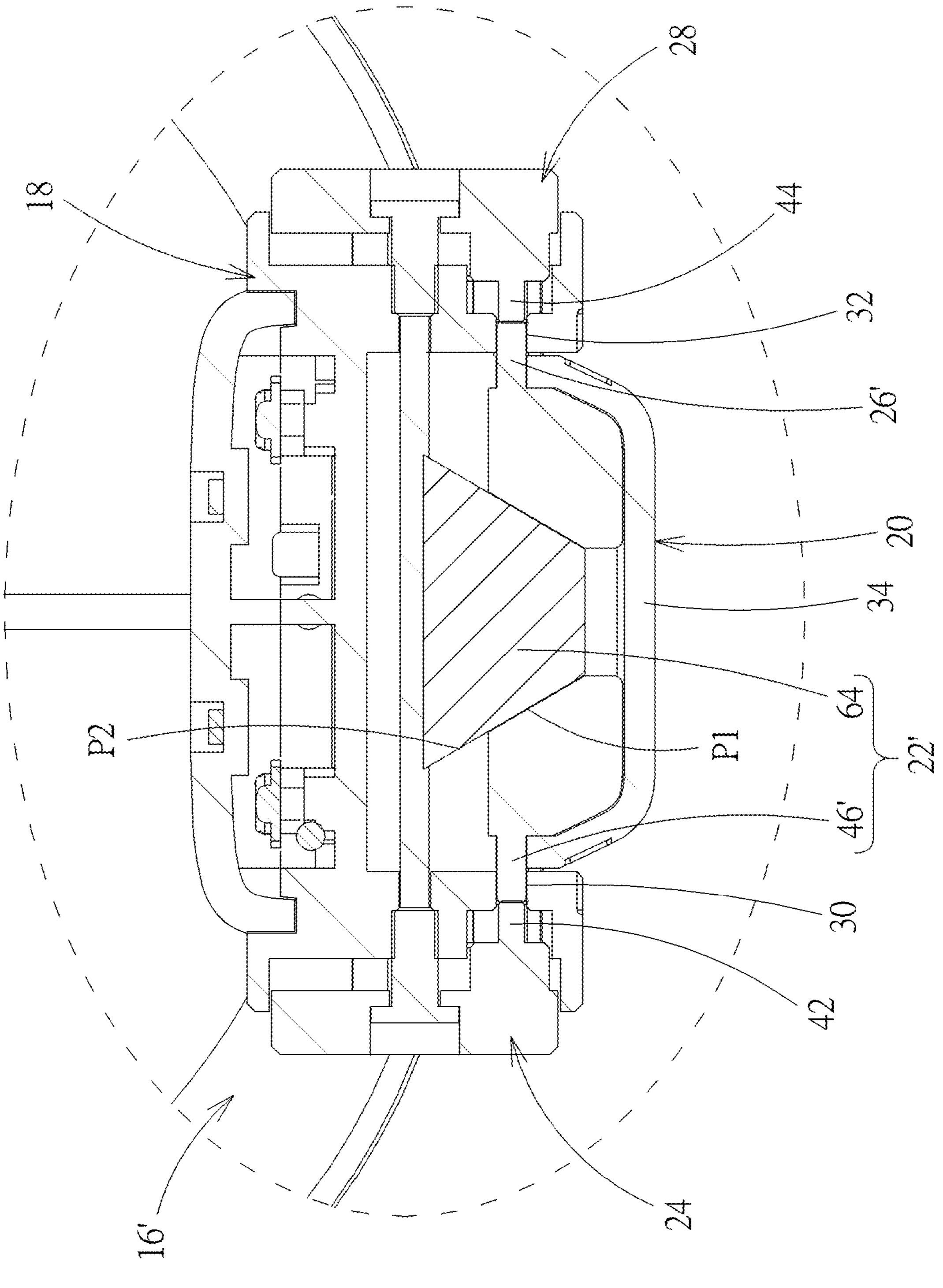
FIG. 8 is a cross-sectional view of a clamping-force adjusting mechanism according to another embodiment of the present invention.

Moreover, the pin returning design of the present invention is not limited to the above embodiments, meaning that the present invention could adopt a counterweight returning design or a magnetic returning design. For example, please refer to FIG. 8, which is a cross-sectional view of a clamping-force adjusting mechanism 16' according to another embodiment of the present invention. Components both mentioned in this embodiment and the aforesaid embodiments represent components with similar structures or functions and the related description could be reasoned by analogy according to the aforesaid embodiments and omitted herein. As shown in FIG. 8, in this embodiment, the clamping-force adjusting mechanism 16' includes the pivot base 18, the adjusting component 20, a first pin 22', the first button 24, a second pin 26', and the second button 28. The first pin 22' could include a pin 46' and a counterweight 64 (the related description of the counterweight returning design of the second pin 26' could be reasoned by analogy and omitted herein). The pin 46' is telescopically disposed through the operating block 34 and has a first inclined end portion P1. The counterweight 64 is movably disposed within the operating block 34 along the direction of gravity and has a second inclined end portion P2 slidably cooperating with the first inclined end portion P1. As such, when the user presses the first button 24, the first protrusion 42 pushes the pin 46' out of the first hole structure 30, so as to allow the user to perform the subsequent pivoting operation of the operating block 34. At the same time, the first inclined end portion P1 pushes the second inclined end portion P2 to slide upward, causing the counterweight 64 to move upward. On the other hand, when the user stops pressing the first button 24, the counterweight 64 moves downward due to gravity for driving the first inclined end portion P1 to move laterally via the second inclined end portion P2 since the counterweight 64 is no longer pushed by the pin 46'. As such, the pin 46' can be driven to extend into the first hole structure 30 for producing an automatic pin returning effect.

Figure 9:
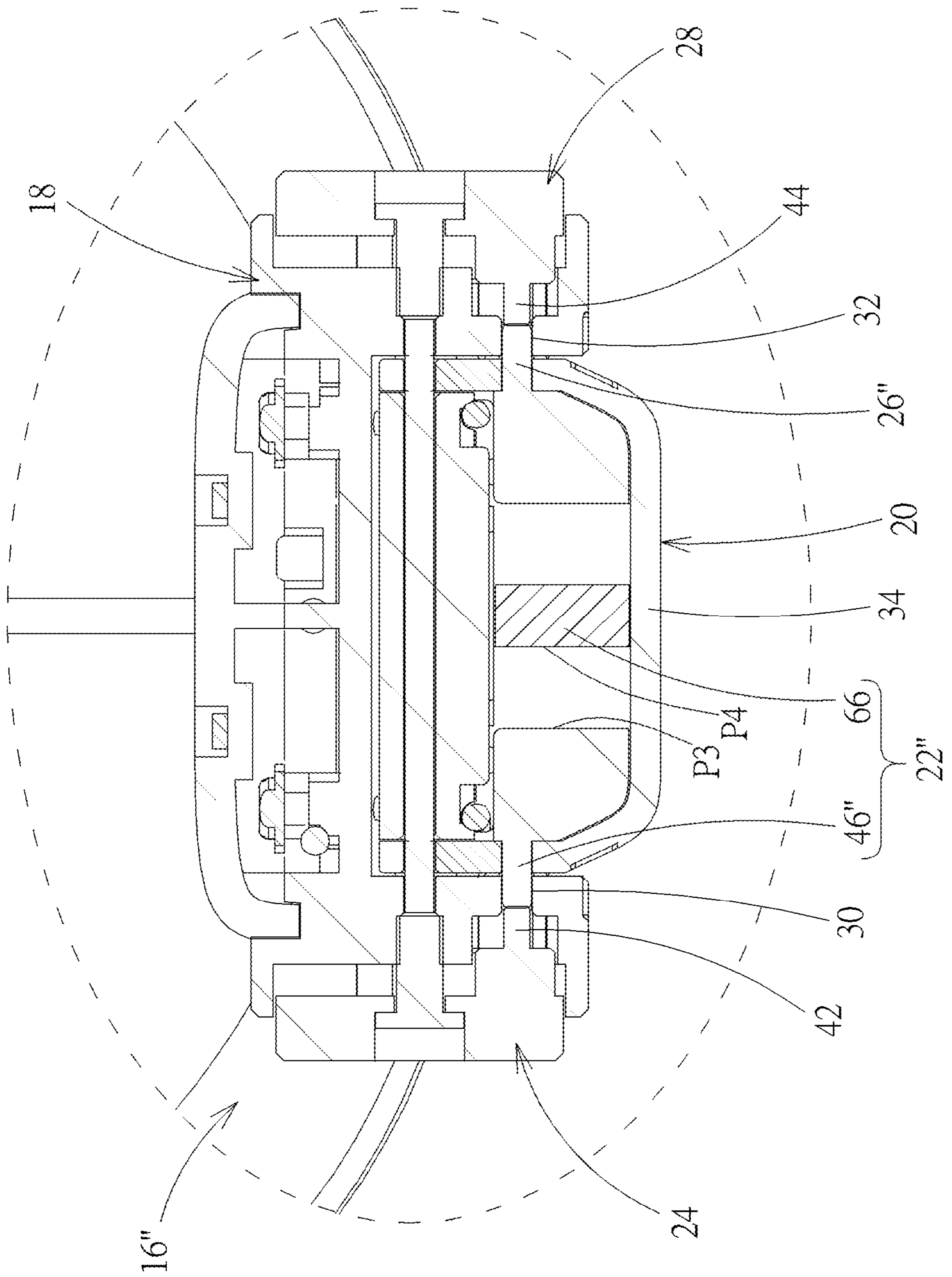
FIG. 9 is a cross-sectional diagram of a clamping-force adjusting mechanism according to another embodiment of the present invention.

In addition, please refer to FIG. 9, which is a cross-sectional diagram of a clamping-force adjusting mechanism 16" according to another embodiment of the present invention. Components both mentioned in this embodiment and the aforesaid embodiments represent components with similar structures or functions and the related description could be reasoned by analogy according to the aforesaid embodiments and omitted herein. As shown in FIG. 9, in this embodiment, the clamping-force adjusting mechanism 16" includes the pivot base 18, the adjusting component 20, a first pin 22", the first button 24, a second pin 26", and the second button 28. The first pin 22" could include a pin 46" and a magnet 66 (the related description of the magnet returning design of the second pin 26" could be reasoned by analogy and omitted herein). The pin 46" is telescopically disposed through the operating block 34 and has a first magnetic end portion P3. The magnet 66 is disposed within the operating block 34 and has a second magnetic end portion P4 magnetically repellent to the first magnetic end portion P3. As such, when the user presses the first button 24, the first protrusion 42 can push the pin 46" out of the first hole structure 30, so as to allow the user to perform the subsequent pivoting operation of the operating block 34. At the same time, the first magnetic end portion P3 approaches the second magnetic end portion P4, causing a magnetic repulsion between the pin 46" and the magnet 66 to gradually increase. On the other hand, when the user stops pressing the first button 24, the magnetic repulsion between the first magnetic end portion P3 and the second magnetic end portion P4 drives the pin 46" to be engaged with the first hole structure 30 since the pin 46" is no longer pushed by the first protrusion 42. As such, the pin 46" can be driven to extend into the first hole structure 30 for producing an automatic pin returning effect.

In practical applications, the present invention could also adopt a magnetic pin returning design. In brief, in another embodiment, the first pin could include a pin and a magnet. The pin is telescopically disposed through the operating block, and the magnet is disposed within the first button for magnetically attracting the pin to return. As such, when the user presses the first button, the first protrusion pushes the pin out of the first hole structure to allow the user to perform the subsequent pivoting operation of the operating block. On the other hand, when the user stops pressing the first button for returning the first button to the original position (e.g., driven by a spring force, but not limited thereto), the magnet can magnetically attract the pin to be engaged with the first hole structure since the pin is no longer pushed by the first protrusion. As such, the pin can be driven to extend into the first hole structure for producing an automatic pin returning effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An over-ear headphone wearable on a user's head, the over-ear headphone comprising:

a headband;

two earmuffs, and two clamping-force adjusting mechanisms connecting the two earmuffs to two ends of the headband respectively, each clamping-force adjusting mechanism comprising:

a pivot base connected to the end of the headband, a first side of the pivot base having a first hole structure;

an adjusting component pivoted to the pivot base and connected to the earmuff;

a first pin telescopically disposed through the adjusting component to be operably engaged with or disengaged from the first hole structure; and a first button pressably disposed at the first side of the pivot base, a first protrusion protruding from the first button toward the first hole structure;

wherein when the first button is pressed, the first protrusion enters the first hole structure to push the first pin out of the first hole structure, for making the adjusting component rotatable to adjust a clamping force of the earmuff upon the user's head;

when the first button is released, the first pin returns to be engaged with the first hole structure for fixing a pivot angle of the adjusting component relative to the pivot base.

2. The over-ear headphone of claim 1, wherein the adjusting component comprises:

an operating block pivoted to the pivot base, the first pin being telescopically disposed in the operating block; and an adjusting rod having a bent section and a length adjusting section, the bent section extending inwardly from the length adjusting section relative to the headband to be connected to the earmuff, and the length adjusting section being slidably disposed through the operating block to adjust a distance between the earmuff and the operating block.

3. The over-ear headphone of claim 1, wherein the first pin comprises:

a pin telescopically disposed through the adjusting component; and an elastic component disposed in the adjusting component and connected to the pin, for providing an elastic force to drive the pin into the first hole structure.

4. The over-ear headphone of claim 1, wherein the first pin comprises:

a pin telescopically disposed through the adjusting component and having a first inclined end portion; and a counterweight movably disposed in the adjusting component along a direction of gravity and having a second inclined end portion slidably cooperating with the first inclined end portion;

wherein when the first button is pressed, the first protrusion pushes the pin out of the first hole structure, and the first inclined end portion pushes the second inclined end portion to slide upward, causing the counterweight to move upward;

when the first button is released, the counterweight moves downward due to gravity for pressing the first inclined end portion to slide laterally via the second inclined end portion, causing the pin to be engaged with the first hole structure.

5. The over-ear headphone of claim 1, wherein the first pin comprises:

a pin telescopically disposed through the adjusting component and having a first magnetic end portion; and a magnet disposed in the adjusting component and having a second magnetic end portion magnetically repellent to the first magnetic end portion;

wherein when the first button is pressed, the first protrusion pushes the pin out of the first hole structure, and the first magnetic end portion approaches the second magnetic end portion;

when the first button is released, a magnetic repulsion between the first magnetic end portion and the second magnetic end portion drives the pin to be engaged with the first hole structure.

6. The over-ear headphone of claim 1, wherein the first pin comprises:

a pin telescopically disposed through the adjusting component; and a magnet disposed in the first button;

wherein when the first button is pressed, the first protrusion pushes the pin out of the first hole structure;

when the first button is released, the magnet attracts the pin to extend to be engaged with the first hole structure.

7. The over-ear headphone of claim 1, wherein the first hole structure comprises at least two holes arranged circumferentially relative to a central pivot shaft of the pivot base; when the first button is pressed, the first protrusion pushes the first pin out of the first hole structure, allowing the first pin to be aligned with one of the at least two holes with rotation of the adjusting component; when the first button is released, the first pin returns to be engaged with the one of the at least two holes for fixing a pivot angle of the adjusting component relative to the pivot base.

8. The over-ear headphone of claim 7, wherein the at least two holes are communicated with each other to form a continuous arc-shaped hole.

9. The over-ear headphone of claim 7, wherein the at least two holes are spaced apart from each other circumferentially and are not communicated with each other.

10. The over-ear headphone of claim 7, wherein the first pin has at least one bump, and each hole has at least one groove corresponding to the at least one bump, and the at least one bump is engaged with the at least one groove to make the first pin engaged with the first hole structure.

11. The over-ear headphone of claim 10, wherein the at least one groove in each hole is tooth-shaped to make the first hole structure form an arc-shaped serrated hole.

12. The over-ear headphone of claim 1, wherein a structural contour of the first protrusion is at least partially matched with the first hole structure, for making the first protrusion push the first pin out of the first hole structure when the first protrusion extends into the first hole structure.

13. The over-ear headphone of claim 1, wherein the pivot base has at least two clamping-force adjustment scales formed circumferentially corresponding to the first hole structure, and the adjusting component has an indicator mark corresponding to the at least two clamping-force adjustment scales; when the adjusting component rotates relative to the pivot base until the indicator mark is aligned with one of the at least two clamping-force adjustment scales, the first pin returns to be engaged with the first hole structure for fixing the pivot angle of the adjusting component relative to the pivot base.

14. The over-ear headphone of claim 1, wherein a second hole structure is formed at a second side opposite to the first side, and each clamping-force adjusting mechanism comprises:

a second pin telescopically disposed through the adjusting component to be operably engaged with or disengaged from the second hole structure; and a second button pressably disposed at the second side of the pivot base, a second protrusion protruding from the second button toward the second hole structure;

wherein when the first button and the second button are pressed, the first protrusion extends into the first hole structure to push the first pin out of the first hole structure, and the second protrusion extends into the second hole structure to push the second pin out of the second hole structure;

when the first button and the second button are released, the first pin returns to be engaged with the first hole structure, and the second pin returns to be engaged with the second hole structure.

* * * * *